(12) United States Patent
Tsao et al.

(10) Patent No.: US 9,643,740 B2
(45) Date of Patent: May 9, 2017

(54) GYROLESS THREE-AXIS SUN ACQUISITION USING SUN SENSOR AND UNSCENTED KALMAN FILTER

(71) Applicant: The Boeing Company, Chicago, IL (US)

(72) Inventors: Tung-Ching Tsao, Torrance, CA (US); Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 740 days.

(21) Appl. No.: 14/181,492

(22) Filed: Feb. 14, 2014

(65) Prior Publication Data

US 2014/0231589 A1 Aug. 21, 2014

Related U.S. Application Data

(60) Provisional application No. 61/765,316, filed on Feb. 15, 2013.

(51) Int. Cl.
*B64G 1/36* (2006.01)

(52) U.S. Cl.
CPC .................. *B64G 1/363* (2013.01)

(58) Field of Classification Search
CPC ....................................... B64G 1/26
USPC ....................................... 244/171
See application file for complete search history.

(56) References Cited

U.S. PATENT DOCUMENTS

| | | | | |
|---|---|---|---|---|
| 4,508,297 A | * | 4/1985 | Mouilhayrat | B64G 1/1007 244/165 |
| 5,452,869 A | * | 9/1995 | Basuthakur | B64G 1/24 244/164 |
| 6,295,021 B1 | * | 9/2001 | Lichten | G01S 19/27 244/171 |
| 7,665,695 B2 | * | 2/2010 | Wang | B64G 1/281 244/164 |
| 7,739,003 B2 | * | 6/2010 | Johnson | B64G 1/281 244/164 |
| 8,131,409 B2 | | 3/2012 | Tsao et al. | |
| 8,321,076 B2 | * | 11/2012 | Sharma | B64G 1/28 244/165 |
| 8,380,370 B2 | * | 2/2013 | Liu | G05D 1/0883 244/158.1 |
| 8,620,496 B2 | | 12/2013 | Liu et al. | |

OTHER PUBLICATIONS

Crassidis and Markley, "Unscented Filtering for Spacecraft Attitude Estimation", AIAA Journal of Guidance, Control, and Dynamics, vol. 26, No. 4 (2003), pp. 536-542.

* cited by examiner

*Primary Examiner* — Brian M O'Hara
*Assistant Examiner* — Keith L Dixon
(74) *Attorney, Agent, or Firm* — Ostrager Chong Flaherty & Broitman P.C.

(57) ABSTRACT

An attitude estimator that uses sun sensor outputs as the only attitude determination measurements to provide three-axis attitude information. This is accomplished by incorporating the Euler equation into the estimator. An unscented Kalman filter is employed to accommodate various nonlinear characteristics and uncertainties of the spacecraft dynamics and thus improve the robustness and accuracy of the attitude estimate.

19 Claims, 6 Drawing Sheets

——— UNIT VECTOR OF $\omega$ IN SPI FRAME
□ –START, ■ –END;
——— SPI Y;

GYROLESS THREE-AXIS SUN ACQUISITION USING SUN SENSOR AND UNSCENTED KALMAN FILTER

RELATED PATENT APPLICATION

This application claims the benefit, under Title 35, United States Code, §119(e), of U.S. Provisional Application No. 61/765,316 filed on Feb. 15, 2013, the disclosure of which is incorporated by reference herein in its entirety.

BACKGROUND

The subject matter disclosed herein is generally directed toward systems and methods for obtaining knowledge of spacecraft attitude without using a gyroscope.

Due to limited resources or gyro failure, spacecraft attitude control systems (ACS) can face drastic challenges in mission accomplishment. Various ACS designs have been proposed to address satellite attitude control without a gyroscope. The critical life-saving maneuver when satellite attitude is lost in space is the so-called sun acquisition maneuver, in which the spacecraft is rotated about an axis normal to the sun line so that a solar panel sees the sun periodically and the rate of rotation about the sun line is regulated.

Spacecraft, such as an Earth-orbiting satellite, can become disoriented during flight. For spacecraft that use solar cells to generate power, in some cases the spacecraft disorientation can affect the proper spacecraft antenna pointing and the output of the spacecraft solar cells, resulting in reduced electrical power to the spacecraft. If the electrical power provided by the solar cells is low, it is advantageous to re-orient the spacecraft and/or solar panels so that the solar cells are perpendicular or nearly perpendicular to the Sun, along a sun line between the Sun and the spacecraft solar panels.

When the spacecraft solar cells are properly oriented relative to the Sun, it can be said that the spacecraft has acquired a proper orientation to the Sun. Information is needed to re-orient a disoriented spacecraft in three-dimensional space. Previously, a gyroscope and/or a star tracker (comprising, e.g., imaging hardware and a high-speed computer processor) were used to provide the needed information. However, both gyroscopes and star trackers are expensive and prone to failure.

A sun sensor senses the direction to the Sun and can be as simple as some solar cells and shades or as complex as a steerable telescope, depending on mission requirements. However, a sun sensor cannot detect a change in spacecraft attitude when the spacecraft rotates about the sun line, and can at most provide two-axis rate information. Alternatively, an earth sensor could be used together with a sun sensor when three-axis attitude and/or rate information is needed. One problem, however, is that an earth sensor cannot be used when the spacecraft is in a transfer orbit or pointing away from the Earth.

There is a need for systems and methods to provide information needed to re-orient a disoriented spacecraft without requiring a gyroscope, resulting in a more reliable and less costly spacecraft.

SUMMARY

The subject matter disclosed in detail below is directed to systems and methods for calculating a spacecraft attitude estimate in the absence of a gyroscope. In some cases, a gyroscope on a satellite or other spacecraft may fail or become inoperative. In other cases, it may be desirable to not fly a gyroscope at all, which would reduce the cost of a satellite or other spacecraft. The system and methodology disclosed herein provide a way to regain lost spacecraft pointing capabilities by deriving estimated attitude information using only sun sensors. In the embodiments disclosed hereinafter, a sun sensor serves as an attitude sensor to generate an attitude estimate that is used in re-orienting the spacecraft. The disclosed embodiments also use an unscented Kalman filter to accommodate various nonlinear characteristics and uncertainties of the spacecraft dynamics to improve the robustness and accuracy of the attitude estimate.

The embodiments disclosed herein rely upon a novel Euler-equation-based formulation which is used to obtain the rate information for rotation about the sun line of a satellite. In this case, the angular rate information about the sun line cannot be obtained from sun sensor measurements. As shown below, the missing attitude information about the sun line can be obtained from the Euler equation. This means that the three-axis attitude information can be constructed using only sun sensor measurements, without the need of a gyroscope or other rate or attitude sensors.

However, there are two difficulties with the foregoing proposed approach. The first difficulty is related to the use of the Euler equation. Namely, the spacecraft inertia matrix used in the Euler equation may not be known correctly, the initial value of the spacecraft angular rate is not known, and there may be unknown uncertainties or external disturbances not included in the equation. The second difficulty is that the attitude drift about the sun line cannot be detected by sun sensors.

One might try to overcome the first difficulty by using an extended Kalman filter to deal with the above-described uncertainties and the unknown initial conditions. An extended Kalman filter requires the derivation of Jacobian matrices. However, because of the severe nonlinearity of the equation and the complexity in deriving the Jacobian matrices for the linearized equations, it is expected that satisfactory results would not be obtained were an extended Kalman filter employed. Instead, an unscented Kalman filter, which does not require either linearization or the derivation of Jacobian matrices, has been shown to be suitable to work with highly nonlinear systems. For example, in a paper entitled "Unscented Filtering for Spacecraft Attitude Estimation", AIAA Journal of Guidance, Control, and Dynamics, Vol. 26, No. 4 (2003), pp. 536-542, Crassidis and Markley showed that by using an unscented Kalman filter and the quaternion kinematic equation with a gyro as rate sensor and a magnetometer as attitude sensor, attitude estimates can converge quickly even with large initial attitude error. Hence, an unscented Kalman filter works well in this situation, i.e., the about-sun line angular rate can be estimated accurately.

The second difficulty is overcome by introducing spacecraft angular momentum in an inertial coordinate system as an additional attitude reference. Because the angular momentum in an inertial coordinate system is fixed in space, this added reference and the available sun reference constitute the two independent attitude references needed to uniquely define an attitude. Consequently, the drift about the sun line problem can be resolved.

The attitude estimator disclosed in detail below can be employed to obtain the optimal spacecraft attitude estimate in the presence of sensor noises and unknown initial conditions and unknown disturbances and unknown spacecraft parameters such as inertia. To overcome the uncertainties and unknown initial conditions, an attitude estimator is proposed that uses an unscented Kalman filter, the quaternion kinematic equation and the Euler dynamic equation, with sun sensors only, to obtain the three-axis attitude information. The attitude estimator disclosed in detail below is expected to be compatible with nearly any attitude controller. The performance of the proposed attitude estimator has been demonstrated by applying it to a three-axis closed-loop sun acquisition process using an onboard processor to control the spin of the spacecraft.

One aspect of the subject matter disclosed herein is a method of estimating a three-axis attitude of a spacecraft, comprising: (a) measuring sun unit vectors at successive instants of time using a plurality of sun sensors attached to a spacecraft; (b) calculating angular rates and angular accelerations of the spacecraft about first and second axes perpendicular to the sun line based on the sun unit vector measurements; (c) calculating an angular acceleration of the spacecraft about the sun line using the sun unit vector measurements, a Euler equation and an unscented Kalman filter; and (d) calculating a three-axis attitude of a spacecraft based on the calculation results in steps (b) and (c). The estimator state of the unscented Kalman filter consists of a sun line spacecraft angular rate and a sun pointing inertial frame to spacecraft body frame quaternion. The method uses spacecraft total angular momentum vector as an additional attitude reference.

Another aspect of the subject matter disclosed herein is a spacecraft comprising a body, at least one solar panel coupled to the body, a plurality of sun sensors arranged on the body, and a computer system programmed to perform the following operations: (a) measuring sun unit vectors at successive instants of time using a plurality of sun sensors attached to a spacecraft; (b) calculating angular rates and angular accelerations of the spacecraft about first and second axes perpendicular to the sun line based on the sun unit vector measurements; (c) calculating an angular acceleration of the spacecraft about the sun line using the sun unit vector measurements, a Euler equation and an unscented Kalman filter; and (d) calculating a three-axis attitude of a spacecraft based on the calculation results in operations (b) and (c).

A further aspect is a method of commanding a satellite to adjust its attitude to achieve sun acquisition, the method comprising: (a) measuring sun unit vectors at successive instants of time using a plurality of sun sensors attached to a spacecraft; (b) calculating angular rates and angular accelerations of the spacecraft about first and second axes perpendicular to the sun line based on the sun unit vector measurements; (c) calculating an angular acceleration of the spacecraft about the sun line using the sun unit vector measurements, a Euler equation and an unscented Kalman filter; (d) calculating a three-axis attitude of a spacecraft based on the calculation results in steps (b) and (c); and (e) commanding changes in spacecraft attitude based on differences between a target three-axis attitude and the calculated three-axis attitude.

Yet another aspect of the subject matter disclosed herein is a system for controlling the attitude of a spacecraft based on sun sensor measurements and not gyroscope measurements, comprising: a spacecraft body; at least one solar panel coupled to the body; a plurality of sun sensors arranged on the body; a control processor that outputs torque commands; and means for producing torques that change the attitude of the spacecraft in response to torque commands from the attitude control processor, wherein the control processor is programmed to perform operations in accordance with software comprising: an attitude estimator for calculating a three-axis attitude of the spacecraft body based on sun unit vector measurements made by the plurality of sun sensors and a Euler equation; and an attitude controller that outputs a torque command based on a difference between a target three-axis attitude/rate and the calculated three-axis attitude/rate. The attitude estimator comprises an unscented Kalman filter having an estimator state consisting of a sun line spacecraft angular rate and a sun pointing inertial frame to spacecraft body frame quaternion. The structures that perform the function of the torque-producing means may include reaction wheels or thrusters.

Other aspects of systems and methods for gyroless attitude control of a spacecraft using sun sensors are disclosed and claimed below.

BRIEF DESCRIPTION OF THE DRAWINGS

Reference will hereinafter be made to the drawings in which similar elements in different drawings bear the same reference numerals.

DETAILED DESCRIPTION

The following detailed description is merely exemplary in nature and is not intended to limit coverage to the described embodiments or the disclosed applications and uses of the described embodiments. Furthermore, there is no intention to be bound by any particular theory expressed, implied or relied upon in the preceding background and summary or in the following detailed description.

In particular, embodiments are disclosed which use a Euclidean expression of three-dimensional spacecraft rates and accelerations, where a spacecraft momentum vector in a known inertial frame of reference is used as a second attitude reference, to estimate the spacecraft three-axis attitude. The estimated attitude is adjusted continuously by clocking the phase about the sun line to maintain the same or nearly the same spacecraft momentum vector component perpendicular to the sun line, thereby preventing attitude estimate drift about the sun line.

One method for achieving three-axis stabilization is to use electrically powered reaction wheels, also called momentum wheels. Massive wheels are mounted aboard the spacecraft.

They provide a means to trade angular momentum back and forth between spacecraft and wheels.

Figure 1:
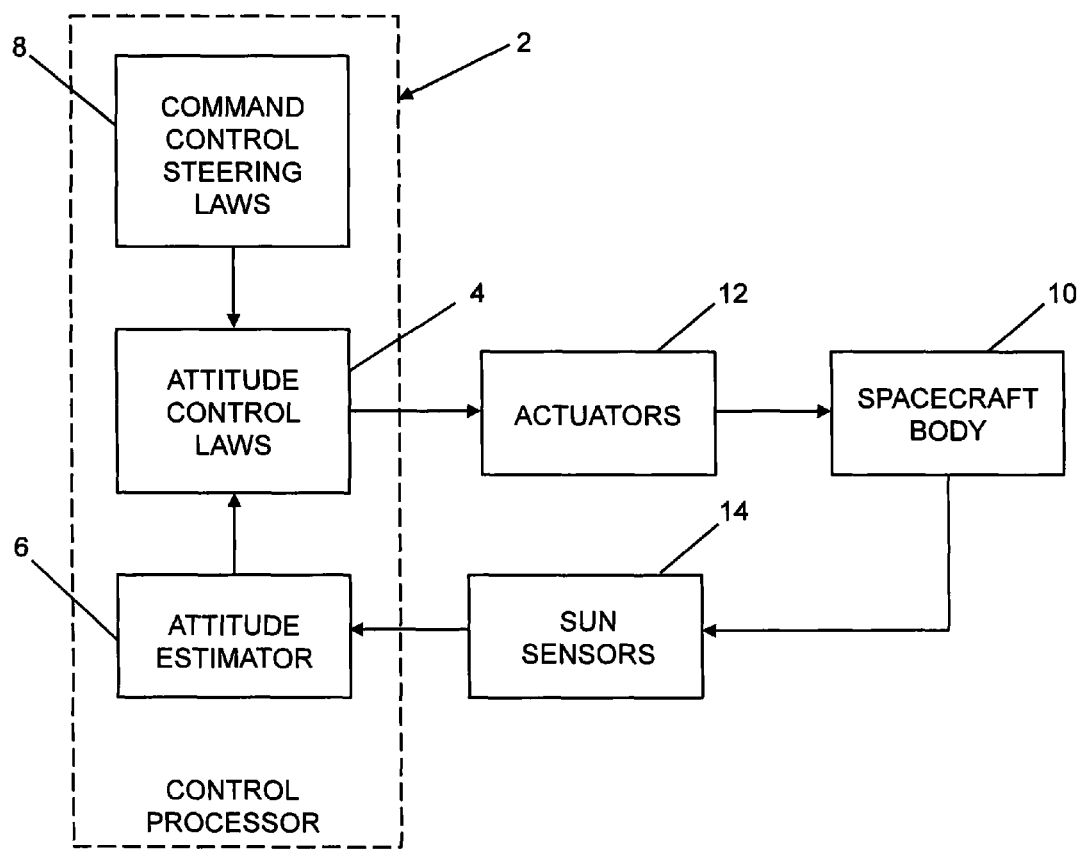
FIG. 1 is a block diagram showing some components of a spacecraft having an attitude control system which is programmed to re-orient a disoriented spacecraft using sun sensor measurements and an unscented Kalman filter.

FIG. 1 shows some components of a spacecraft having an attitude control processor 2 that is programmed to re-orient a disoriented spacecraft using measurements acquired by one or more sun sensors 14 mounted to the spacecraft body 10, which sense the direction to the Sun. The spacecraft body 10 can be rotated about three axes by means of a multiplicity of actuators 12. The actuators 12 can be either reaction wheels or thrusters, or both reaction wheels and thrusters can be used. Preferably the actuators 12 include respective sets of actuators for each axis of rotation.

The attitude control processor 2 is capable of executing attitude control operations in accordance with instructions stored in a plurality of flight software modules, including an attitude estimator 6, attitude control laws 4, and command control steering laws 8 referenced to an inertial frame with a fixed offset to an ECI frame of reference. The attitude control processor 2 applies the attitude control laws 4 based on the command control steering laws module 8 and attitude estimates from the attitude estimator 6, performing calculations to determine the appropriate commands to issue to the actuators 12. The attitude control laws 4 comprise algorithms to command the actuators 12 based on sensor measurements of the current attitude/rate and specification of a desired attitude/rate in accordance with command control steering laws 8.

The attitude control laws 4 include a sun-sensor-only gyroless sun acquisition algorithm that outputs torque commands to direct the acquisition maneuvers and place the spacecraft body 10 in a power/thermal safe state. The attitude estimator 10 is programmed to compute spacecraft attitude and rate estimates based on attitude measurements received from the sun sensors 14 without any input from a gyroscope or from star trackers. The attitude control laws 4 use the commanded and estimated attitudes and estimated rates to compute the thruster or wheel torques, or both.

In accordance with one embodiment, the attitude estimator 6 seen in FIG. 1 involves an attitude estimation processing which uses the attitude measurements from the sun sensors (and does not use measurements from gyroscopes or star trackers) as input to derive the quaternion estimates (i.e., the estimated spacecraft attitude in terms of a quaternion), which quaternion estimates are used by the software module that implements the attitude control laws 4. The attitude estimator 6 can also compute rate estimates based on the attitude measurements. A rate estimate is an estimate of the spacecraft roll, pitch and yaw body rates with respect to an inertial reference frame. The computations performed by attitude estimator 6 are disclosed in detail below.

In accordance with one embodiment, the attitude estimator 6 is programmed to calculate estimates of the spacecraft attitude based on sensor feedback from one or more sun sensors 14, without feedback from any gyroscope or star tracker. The sun sensor only attitude estimation algorithm employs an unscented Kalman filter. This sun-sensor-only gyroless attitude estimator and its properties are described in the following sections.

Attitude Information about Sun Line

Figure 2:
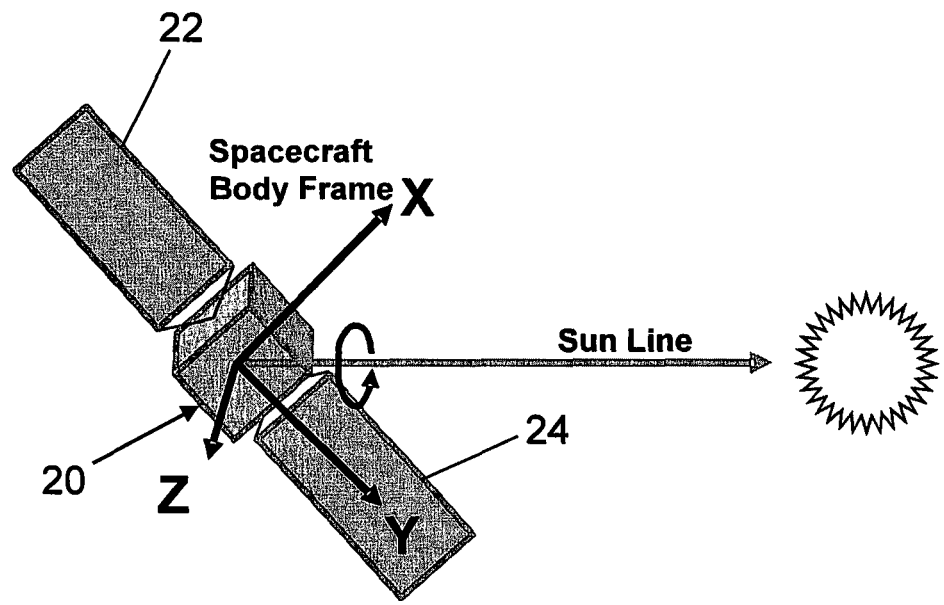
FIG. 2 is a diagram representing a spacecraft that is rotating about a sun line. The frame of reference of the spacecraft body is indicated by X, Y and Z axes.

FIG. 2 shows a position of a spacecraft relative to the Sun. The spacecraft comprises a spacecraft body 20 and a pair of solar panels 22 and 24 which are stowable and deployable. Assume that a sun sensor (not shown) onboard the spacecraft sees the Sun. Sun sensor measurements can be used to compute a sun unit vector represented in an X, Y and Z coordinate system that is fixed relative to the spacecraft body (hereinafter "the spacecraft body frame"). The sun unit vector has a normalized length and is directed along the sun position vector relative to the spacecraft body frame. As shown in FIG. 2, the sun position vector pointing from the spacecraft to the Sun will be referred to herein as the "sun line". When the spacecraft rotates about the sun line, the sun unit vector expressed in the spacecraft body frame remains the same. In other words, the sun sensor aimed along the sun line does not provide attitude information regarding rotation about the sun line; it only provides attitude information about directions perpendicular to the sun line.

Let $^b s^m(t_1)$ and $^b s^m(t_2)$ be sun unit vectors measured by a sun sensor at times $t_1$ and $t_2$ respectively. When $t_2$ is close to $t_1$, the spacecraft angular rate $^b \omega^m$ can be calculated as $$^b\omega^m = \frac{^b s^m(t_1) \times {^b s^m(t_2)}}{t_2 - t_1}$$

As used herein, a superscript "b" on left of a vector means the vector is resolved in the frame of reference (i.e., the coordinate system) of the spacecraft body.

Figure 3:
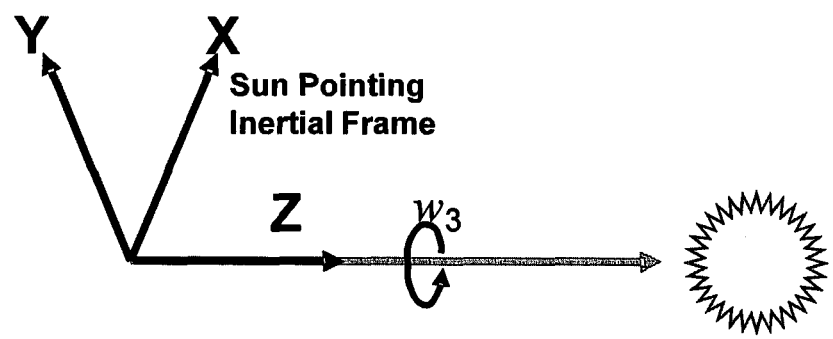
FIG. 3 is a diagram showing X, Y and Z axes of a sun pointing inertial frame of reference.

In contrast, FIG. 3 shows a Sun Pointing Inertial (SPI) frame of reference. The SPI frame is defined to be an inertially fixed coordinate system with its Z-axis pointing to the Sun. The direction cosine matrix $C_{b\_SPI}$ maps the SPI frame of reference to the spacecraft body frame coordinates. Let the true spacecraft angular rate be $$^b\omega = C_{b\_SPI} {^{SPI}\begin{bmatrix} w_1 \\ w_2 \\ w_3 \end{bmatrix}}$$

for some $w_1$, $w_2$ and $w_3$.

Since sun sensor measurements do not change when the spacecraft rotates about the sun line, the angular rate about the sun line derived from sun sensor measurements should be zero; i.e., mathematically the measured spacecraft angular rate is $$^b\omega^m = C_{b\_SPI} {^{SPI}\begin{bmatrix} w_1 \\ w_2 \\ 0 \end{bmatrix}} = \frac{^b s^m(t_1) \times {^b s^m(t_2)}}{t_2 - t_1} \qquad (1)$$

Sun-Sensor-Only Attitude Estimator

In accordance with one embodiment, the sun-sensor-only attitude estimator has the following form similar to that of an extended Kalman filter:

$$\text{Attitude Estimator:} \begin{cases} \text{propagation \& correction: } \dot{\hat{x}} = f(\hat{x}) + K(y^m - \hat{y}) \\ \text{predicted measurement } \hat{y} = h(\hat{x}) \\ \text{measurement } y^m = [{^b s^{mT}}, {^b \omega^{mT}}]^T \end{cases} \qquad (2)$$

where K is the optimal state correction gain. As used herein, the symbol ^ on top of a variable indicates estimate.

In Eqs. (2), the estimate or the estimator state $\hat{x}$ consists of the missing sun line spacecraft angular rate and the estimated SPI-to-spacecraft body frame quaternion:

$$\hat{x} = [\hat{w}_3, \hat{q}_{b\_SPI}^T]^T.$$

The propagation function $f(\hat{x})$ is computed as $$\dot{\hat{w}}_3 = 0 \qquad (3)$$

$$\dot{\hat{q}}_{b\_SPI} = \frac{1}{2}\hat{\Omega}(\omega)\hat{q}_{b\_SPI}$$

(i.e., the quaternion kinematics equation), where $\omega$ is the three-component angular rate vector and $$\hat{\Omega}(\omega) = \begin{bmatrix} -[^b\hat{\omega}\times] & {}^b\hat{\omega} \\ -{}^b\hat{\omega}^T & 0 \end{bmatrix} = \begin{bmatrix} 0 & \hat{v}_3 & -\hat{v}_2 & \hat{v}_1 \\ -\hat{v}_3 & 0 & \hat{v}_1 & \hat{v}_2 \\ \hat{v}_2 & -\hat{v}_1 & 0 & \hat{v}_3 \\ -\hat{v}_1 & -\hat{v}_2 & -\hat{v}_3 & 0 \end{bmatrix} \qquad (4)$$

and the angular rate estimate in the spacecraft body frame of reference is $$\begin{bmatrix} \hat{v}_1 \\ \hat{v}_2 \\ \hat{v}_3 \end{bmatrix} = \hat{C}_{b\_SPI}^{SPI} \begin{bmatrix} \text{first two elements of } \hat{C}_{b\_SPI}^T {}^b\omega^m \\ \hat{w}_3 \end{bmatrix} \equiv {}^b\hat{\omega} \qquad (5)$$

The measurement $y^m$ consists of the measured sun unit vector ${}^b s^m$ and the measured spacecraft angular acceleration ${}^b\dot{\omega}^m$ derived from the measured sun unit vector: $y^m = [{}^b s^{m^T}, {}^b\dot{\omega}^{m^T}]^T$. After converting the quaternion $\hat{q}_{b\_SPI}$ into a direction cosine matrix, the predicted measurement $\hat{y} = h(\hat{x}) = [{}^b\hat{s}^T, {}^b\dot{\hat{\omega}}_{12}^T]^T$ is computed as $${}^b\hat{s} = \hat{C}_{b\_SPI, 3rd, column}$$

$${}^b\dot{\hat{\omega}}_{12} = {}^b\dot{\hat{\omega}} - [{}^b\hat{\omega}\times]\hat{C}_{b\_SPI}^{SPI}\hat{\omega}_3 \qquad (6)$$

where $\dot{\hat{\omega}}_{12}$ is the predicted spacecraft angular acceleration that does not contain the acceleration about sun line, ${}^b\dot{\hat{\omega}}$ is calculated from the Euler equation $${}^b\dot{\hat{\omega}} = -\hat{I}^{-1}({}^b\hat{\omega}\times\hat{I}{}^b\hat{\omega}),$$

$\hat{I}$ is the knowledge inertia matrix, $[{}^b\hat{\omega}\times]$ is a 3 by 3 matrix satisfying the equation $$[{}^b\hat{\omega}\times]h = {}^b\hat{\omega}\times h$$

for any vector h, i.e., $$[{}^b\hat{\omega}\times] = \begin{bmatrix} 0 & -\hat{v}_3 & \hat{v}_2 \\ \hat{v}_3 & 0 & -\hat{v}_1 \\ -\hat{v}_2 & \hat{v}_1 & 0 \end{bmatrix}, \text{ and } {}^{SPI}\hat{\omega}_3 \equiv {}^{SPI}[0, 0, \hat{w}_3]^T.$$

Note that the derived measured spacecraft angular rate ${}^b\omega^m$ does not contain information regarding the spacecraft angular rate about the sun line; similarly, ${}^b\dot{\omega}^m$ does not contain information regarding the spacecraft angular acceleration about sun line.

The derivation of Eq. (6) is given below. Let the about-sun-line angular rate be ${}^{SPI}\omega_3 = {}^{SPI}[0, 0, \omega_3]^T$ and let ${}^b\omega_3 = C_{b\_SPI}{}^{SPI}\omega_3$. Then the spacecraft body frame acceleration contributed by the change of angular rate about the sun line is $${}^b\dot{\omega}_3 = [{}^b\omega\times]C_{SPI}{}^{SPI}\omega_3 + C_{SPI}{}^{SPI}\dot{\omega}_3. \qquad (7)$$

Also let $${}^b\dot{\omega}_{12} = {}^b\dot{\omega} - {}^b\dot{\omega}_3 \qquad (8)$$

be the angular acceleration without the about-sun-line component. Combining Eqs. (7) and (8) gives $${}^b\dot{\omega}_{12} = {}^b\dot{\omega} - [{}^b\omega\times]C_{SPI}{}^{SPI}\omega_3 - C_{SPI}{}^{SPI}\dot{\omega}_3 \qquad (9)$$

Equation (6) is then obtained from Eqs. (3) and (9).

To overcome any drift of the attitude estimate about the sun line, which cannot be detected by the sun sensor, the spacecraft total angular momentum in the SPI frame is calculated each time the estimate state is updated and the estimated quaternion is adjusted to maintain a fixed orientation of the total angular momentum.

Observability of About-Sun-Line Angular Rate Estimate Error

It can be demonstrated that error in the about-sun-line angular rate estimate, which cannot be detected by a sun sensor, is observable through the Euler equation:

$${}^b\dot{\omega} = {}^b\dot{\omega}_{12} + {}^b\dot{\omega}_3 = -I^{-1}\left[{}^b\omega\times I\left(C_{b\_SPI}\begin{bmatrix}w_1\\w_2\\0\end{bmatrix} + C_{b\_SPI}\begin{bmatrix}0\\0\\w_3\end{bmatrix}\right)\right] \qquad (10)$$

From Equations (7) and (10), we have $${}^b\dot{\omega}_{12} = -I^{-1}\left[{}^b\omega\times I\left(C_{b\_SPI}\begin{bmatrix}w_1\\w_2\\0\end{bmatrix} + C_{b\_SPI}\begin{bmatrix}0\\0\\w_3\end{bmatrix}\right)\right] - [{}^b\omega\times]C_{b\_SPI}{}^{SPI}\omega_3 - C_{b\_SPI}{}^{SPI}\dot{\omega}_3$$

In the above equation, ${}^b\dot{\omega}_{12}$, $w_1$ and $w_2$ can be derived from sun sensor measurements. If the true $w_3$ is constant and its estimate $\hat{w}_3$ is incorrect, then the predicted value $${}^b\dot{\hat{\omega}}_{12} = -\hat{I}^{-1}\left[{}^b\hat{\omega}\times\hat{I}\left(\hat{C}_{b\_SPI}\begin{bmatrix}w_1\\w_2\\0\end{bmatrix} + \hat{C}_{b\_SPI}\begin{bmatrix}0\\0\\\hat{w}_3\end{bmatrix}\right)\right] - [{}^b\hat{\omega}\times]\hat{C}_{b\_SPI}{}^{SPI}\hat{\omega}_3 - \hat{C}_{b\_SPI}{}^{SPI}\dot{\hat{\omega}}_3$$

will be different from the measurable ${}^b\dot{\omega}_{12}$, assuming all other variables in the equation are correct. This shows the observability of $w_3$ and this is the reason why Eq. (6) is used as one of the predicted measurement functions to estimate the about-sun-line angular rate. Note that $w_3$ is assumed to be constant, so ${}^{SPI}\dot{\hat{w}}_3$ in Eq. (3) is zero.

Unscented Kalman Filter

The proposed sun sensor only attitude estimator expressed in Eqs. (2) is nonlinear with high non-linearity as shown in the propagation function, Eqs. (3) and (4), and the predicted measurement function, Eq. (6). Although extended Kalman filters have been commonly used for nonlinear systems, an extended Kalman filter can be unreliable for systems with severe non-linearity. Furthermore, the use of an extended Kalman filter requires the derivation of Jacobian matrices, i.e., the linearization of the propagation function and the predicted output function with respected to the estimator state, which can be extremely complicated for equations like Eqs. (3), (4) and (6). On the other hand, the unscented Kalman filter is suitable for highly nonlinear systems and it does not require the derivation of Jacobian matrices.

The unscented Kalman filter predicts probability distribution of the random state of a nonlinear function through behaviors of 2n points drawn from a prior distribution of the random state, where n is the dimension of the state. The unscented Kalman filter uses a deterministic sampling approach in which the state distribution is represented using a minimal set of selected sample points, called sigma points. The propagation and correction of an unscented Kalman filter (UKF) are performed on the sigma points $\hat{x}_{k-1}^{(i)}$ around the UKF estimator state $\hat{x}_{k-1}^{+}$, where the subscript k-1 indicates the time instant.

Figure 4:
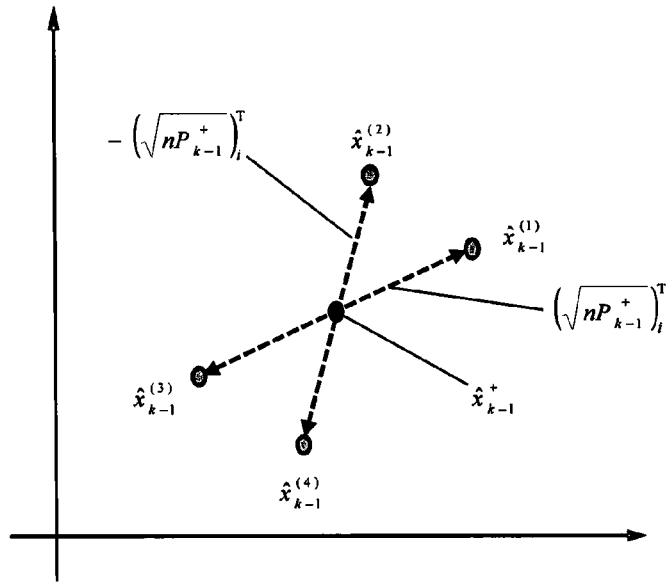
FIG. 4 is a graph showing four sigma points $\hat{x}_{k-1}^{(1)}$, $\hat{x}_{k-1}^{(2)}$, $\hat{x}_{k-1}^{(3)}$, and $\hat{x}_{k-1}^{(4)}$ positioned around an unscented Kalman filter estimator state $\hat{x}_{k-1}^+$, where the subscript k-1 indicates the time instant.

FIG. 4 is a graph depicting an example wherein four sigma points $\hat{x}_{k-1}^{(1)}$, $\hat{x}_{k-1}^{(2)}$, $\hat{x}_{k-1}^{(3)}$, and $\hat{x}_{k-1}^{(4)}$ are positioned around the UKF estimator state $\hat{x}_{k-1}^{+}$. The distances between the estimator state $\hat{x}_{k-1}^{+}$ and the sigma points are defined by the error covariance $P_{k-1}^{+}$ as follows:

$$\hat{x}_{k-1}^{(i)} = \hat{x}_{k-1}^{+} + \tilde{x}^{(i)}, \text{ where } i=1,\ldots,2n;$$

$$\tilde{x}^{(i)} = (\sqrt{nP_{k-1}^{+}})_i^T \text{ where } i=1,\ldots,n;$$

$$\tilde{x}^{(n+i)} = -(\sqrt{nP_{k-1}^{+}})_i^T \text{ where } i=1,\ldots,n$$

where $(.)_i$ means the i-th row and the dimension of $\hat{x}_{k-1}^{+}$ is n=5.

Propagation of Unscented Kalman Filter

The sigma points are propagated according to the discretized propagation function defined in Eqs. (3) and (4). The a priori estimate $\hat{x}_k^-$, i.e., the propagated estimate, is taken to be the mean of the propagated sigma points.

$$\hat{x}_k^{(i)} = f_{discretized}(\hat{x}_{k-1}^{(i)}),$$

$$\hat{x}_k^- = \frac{1}{2n}\sum_{i=1}^{2n} \hat{x}_k^{(i)}$$

The a priori covariance $P_k^-$, i.e., the propagated covariance, is then calculated based on the distance between the sigma points and the propagated estimator state as shown below:

$$P_k^- = \frac{1}{2n}\sum_{i=1}^{2n}(\hat{x}_k^{(i)} - \hat{x}_k^-)(\hat{x}_k^{(i)} - \hat{x}_k^-)^T + Q_{k-1}$$

In the above, $Q_{k-1}$ is the error covariance associated with the propagation function.

Update of Unscented Kalman Filter

Figure 5:
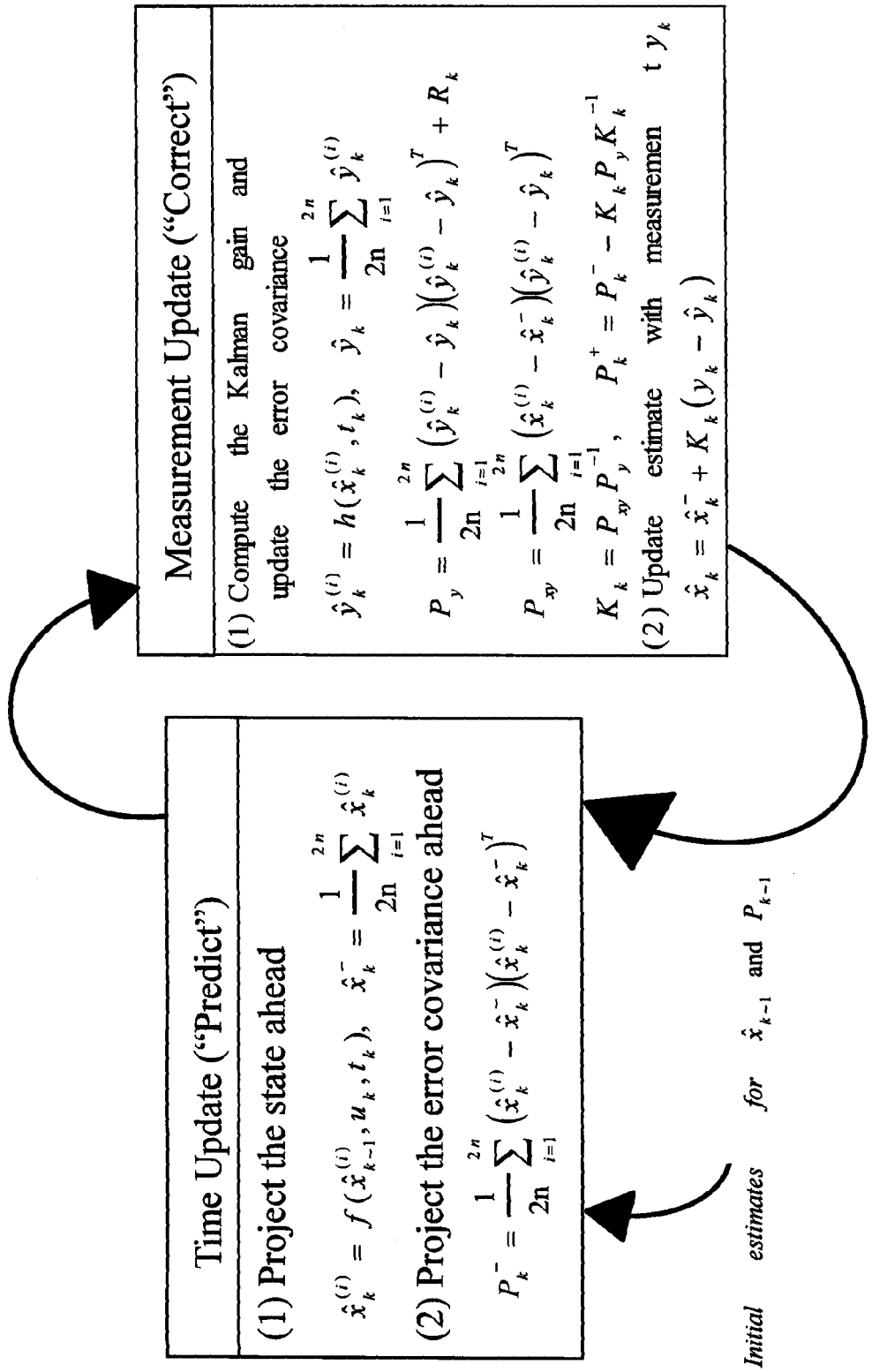
FIG. 5 is a diagram representing an unscented Kalman filter estimation process.

The unscented Kalman filter estimation process is depicted in FIG. 5. To compute the Kalman gain and to update the covariance, first the predicted measurements $\hat{y}_k^{(i)}$ based on the propagated sigma points $\hat{x}_k^{(i)}$ are calculated according to the predicted measurement function given in Eq. (6). The mean of the predicted measurements is defined to be $\hat{y}_k$. The a posteriori covariance $P_k^+$, i.e., the updated covariance, and the Kalman gain $K_k$ are calculated based on the predicted outputs and their mean as follows:

$$\hat{y}_k^{(i)} = h(\hat{x}_k^{(i)}), \hat{y}_k = \frac{1}{2n}\sum_{i=1}^{2n}\hat{y}_k^{(i)}$$

-continued $$P_y = \frac{1}{2n}\sum_{i=1}^{2n}(\hat{y}_k^{(i)} - \hat{y}_k)(\hat{y}_k^{(i)} - \hat{y}_k)^T + R_k$$

$$P_{xy} = \frac{1}{2n}\sum_{i=1}^{2n}(\hat{x}_k^{(i)} - \hat{x}_k^-)(\hat{y}_k^{(i)} - \hat{y}_k)^T$$

$$K_k = P_{xy}P_y^{-1}, P_k^+ = P_k^- - K_k P_y K_k^{-1}$$

(See D. Simon, "Optimal State Estimation," John Wiley & Sons, Inc., Hoboken, N.J., 2006.) In the above equations, $R_k$ is the measurement noise covariance derived from the sun sensor noise variance. Finally, the a priori estimate is updated using the obtained Kalman gain and the sun sensor measurement $y_k^m$ given in Eq. (2) to produce the a posteriori, or updated, estimate $\hat{x}_k^+$:

$$\hat{x}_k^+ = \hat{x}_k^- + K_k(y_k^m - \hat{y}_k).$$

Figure 6:
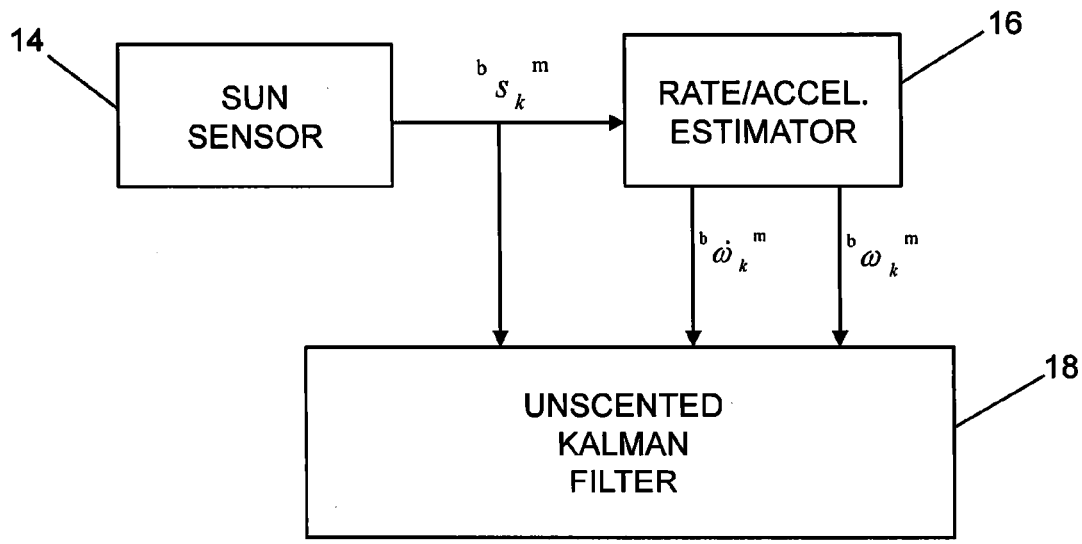
FIG. 6 is a block diagram showing inputs to an unscented Kalman filter.

FIG. 6 is a block diagram showing inputs to an unscented Kalman filter 18. The Kalman filter receives the sun unit vector ${}^b s_k^m$ from the sun sensor 14 and the angular rates ${}^b\omega_k^m$ and angular accelerations ${}^b\dot{\omega}_k^m$ from a rate/acceleration estimator 16, which is part of the attitude estimator 6 shown in FIG. 1. The Kalman filter 18 is also part of attitude estimator 6.

Sun Acquisition

The sun-sensor-only attitude estimator disclosed herein is expected to be able to work with any attitude controller. In a paper entitled "Gyroless Transfer Orbit Sun Acquisition Using Only Wing Current Measurement Feedback," AIAA Guidance, Navigation and Control Conference, Aug. 10-13, 2009 (the contents of which are incorporated by reference herein in their entirety), the authors showed that sun acquisition can be accomplished using the spin (i.e., attitude) controller introduced in that paper. That spin controller is capable of controlling spacecraft spin axis orientation and spin rate. The spin controller can be used to: (1) command a spacecraft to spin along its major or minor axis by changing the sign of the controller gain; and (2) command the spin axis orientation to line up with an inertial-fixed direction and rotate at a specified spin rate by using a momentum offset vector.

The foregoing spin controller, together with a Rate and Quaternion Estimator of the type disclosed herein, can be used to drive the spacecraft to achieve a sun acquisition maneuver using only sun sensor feedback, i.e., without the need of any other sensors. The output of the spin controller is a momentum command having the following structure:

$${}^b h_{ctrl} = k_{ctrl}({}^b\hat{I}^b\hat{\omega} \times {}^b\hat{\omega}) + {}^b h_{offset}$$

(${}^b\omega = {}^b\omega_{SPI}^b$ for notation simplification.) This spin controller can be used to command a spacecraft to spin along any of the three principal axes, including the intermediate axis if a matrix value of gain $k_{ctrl}$ is used. The torque command applied to the spacecraft is ${}^b\tau_{ctrl} = -d^b h_{ctrl}/dt$; ${}^b h_{ctrl}$ is the momentum command; $k_{ctrl}$ is the scalar controller gain; ${}^b\hat{I}$ is the knowledge value of spacecraft inertia; and ${}^b h_{offset}$ is the offset angular momentum vector to command the spacecraft spin axis to a desired orientation and magnitude. The spin controller has the property that the spin axis will converge to the major axis when $k_{ctrl} < 0$ and will converge to the minor axis when $k_{ctrl} > 0$. In other words, the spin controller can be used to re-orient the spacecraft by simply changing the sign of its gain value.

The spacecraft total angular momentum is the sum of the reaction wheel angular momentum and the spacecraft angular momentum. Since the total angular momentum is fixed inertially, when the reaction wheel angular momentum changes, the spacecraft angular momentum needs to change accordingly to maintain a constant total angular momentum. To use the spin controller for sun acquisition, the reaction wheel offset angular momentum is selected such that when the spacecraft major or minor axis (depending on the sign of $k_{ctrl}$) is aligned with the spacecraft angular momentum vector, the solar panels will receive maximum current periodically at an appropriate angular rate.

Because a sun sensor does not provide information regarding spacecraft rotation about the sun line, any drift of the attitude estimate about the sun line cannot be detected. This drift can be prevented by applying the principle that the total angular momentum is fixed in inertial frame to the estimator design. The idea is to keep constant the angle between the X-axis of the SPI frame and the component of the estimated total angler momentum that is perpendicular to the sun line. (Note that Z-axis of the SPI frame is along sun line direction). An implementation of such idea is to add an arbitrary constant angle to the measurements $y_m$ as an additional element. The predicted angle is calculated from the predicted total angular momentum in the SPI frame, including the estimated angular momentum of the reaction wheel assembly and the estimated angular momentum of the spacecraft, converted to the SPI frame using the estimated attitude. To be exact, it is the angle between the SPI X-axis and the component of the predicted total angler momentum that is perpendicular to the SPI Z-axis.

Sun Acquisition Simulation

Figure 7:
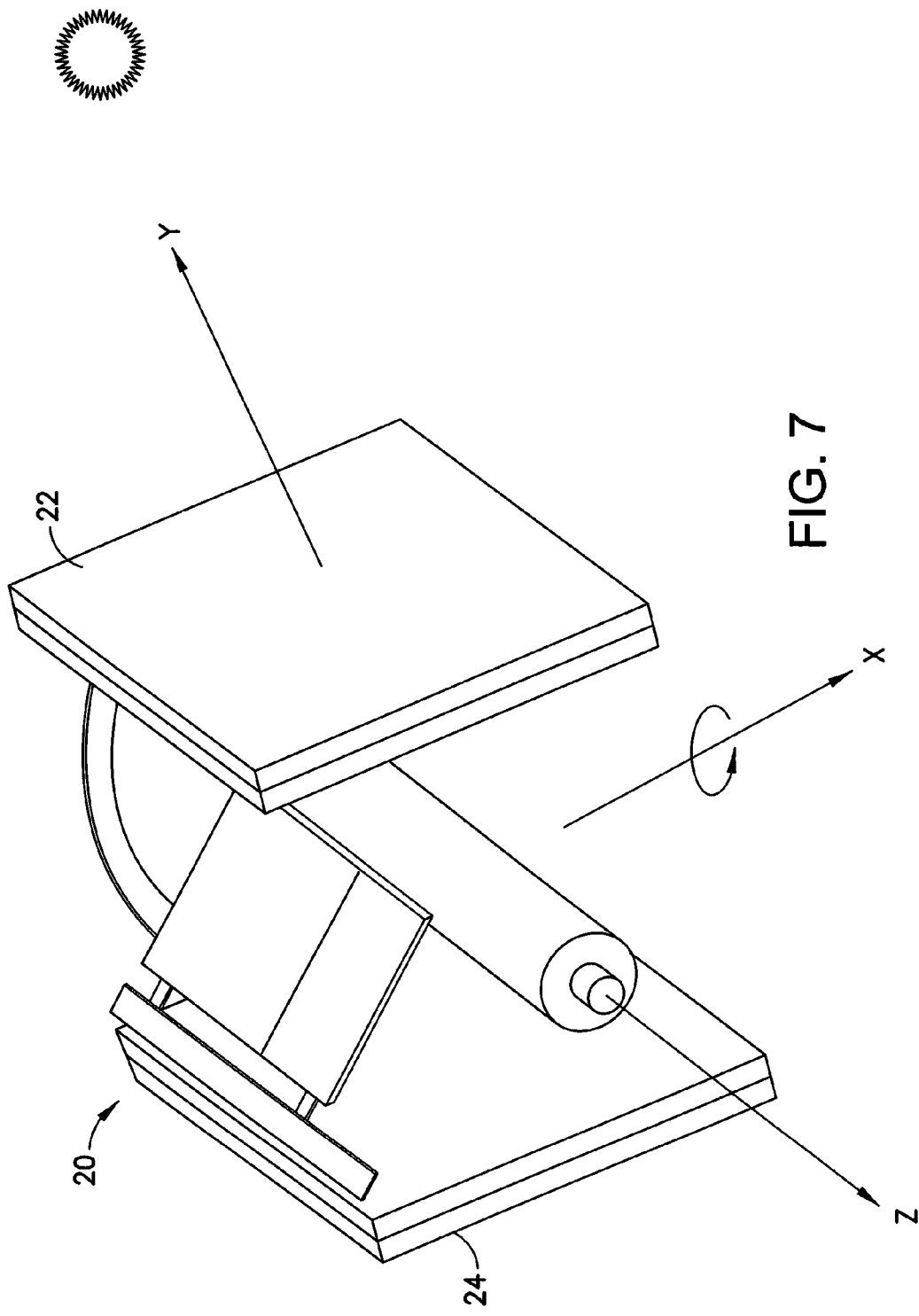
FIG. 7 is a diagram representing a spacecraft that has solar panels facing in respective opposite directions along the ±Y axes.

A sun acquisition simulation was run for the purpose of verifying the performance and robustness against uncertainties and sensor noise of a sun-sensor-only attitude controller employing an unscented Kalman filter. The spacecraft was assumed to have solar panels facing the $\pm Y$ axes, as shown in FIG. 7. There were two control objectives for the simulation: (1) make the spacecraft spin about its major axis, which is close to the X axis of the spacecraft body frame; and (2) make the spin axis perpendicular to the sun line so that the solar panels can see the Sun periodically and produce maximum peak current. The first objective was accomplished by choosing a negative controller gain. The second objective was accomplished by selecting an appropriate reaction wheel offset angular momentum.

The sun acquisition simulation was performed for the following two cases.

Case 1:

One simulation was run for the case of a 6 deg/sec initial rate estimate error with exact moment of inertia knowledge. The initial truth angular rate was 0.75 deg/sec about the Z axis of the spacecraft body frame; the final angular rate was 0.16 deg/sec about the X axis of the spacecraft body frame.

Case 2:

Another simulation was run for the case of 6 deg/sec initial rate estimate error with 2% moment of inertia knowledge error and 10 mdeg 3σ sun sensor noise. The initial angular rate was 1.25 deg/sec about the Z axis of the spacecraft body frame; the final angular rate was 0.27 deg/sec about the X axis of the spacecraft body frame.

Figure 8:
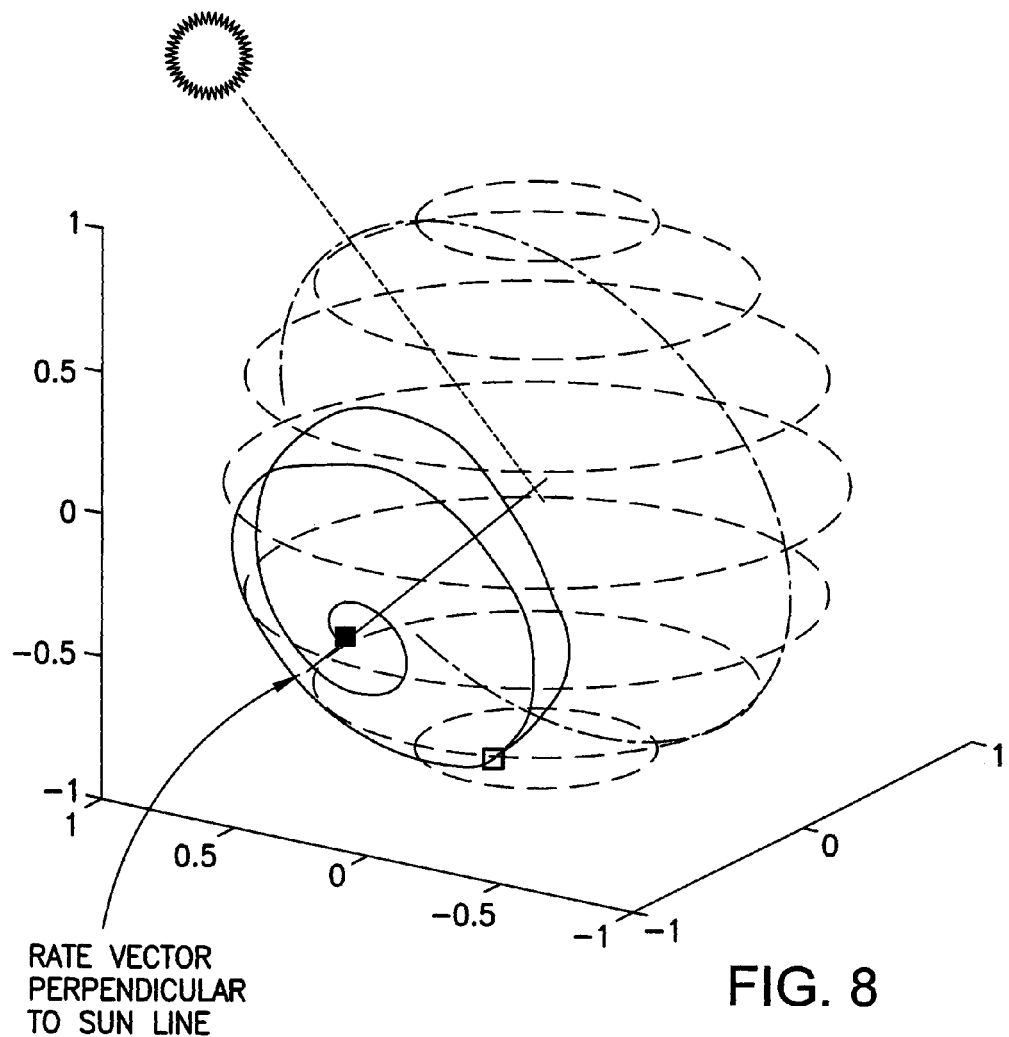
FIG. 8 is a diagram showing sun acquisition simulation results for a case having a 6 deg/sec initial rate estimate error with exact moment of inertia knowledge.

Case 1 Results:

As shown in a paper entitled "Gyroless 3-Axis Sun Acquisition via Sun Sensors Only Unscented Kalman Filter Estimation", AIAA Guidance, Navigation and Control Conference, Aug. 19-22, 2013 (the contents of which are incorporated by reference herein in their entirety), the simulation results showed that the spacecraft body rate started from Z spin and converged to X spin after the activation of the spin controller. In addition, the peak current converged to a maximum value. FIG. 8 shows that the spacecraft rate vector converged spirally to a vector (the straight line) perpendicular to sun line. The solid spiral indicates the path of the tip of a unit vector of ω in the SPI frame of reference. The symbol □ indicates the starting point; the symbol ■ indicates the end point. The dash-dot curved line indicates the path of the tip of the Y axis of the SPI frame of reference.

Case 2 Results:

Case 2 results are also presented in detail in the paper entitled "Gyroless 3-Axis Sun Acquisition via Sun Sensors Only Unscented Kalman Filter Estimation". The results were very similar to those of Case1. This demonstrated the robustness of the sun-sensor-only attitude estimator disclosed herein against uncertainty and sensor noise in a sun acquisition application.

In view of the foregoing, it should be apparent that three-axis attitude information can be obtained by using a sun sensor as the only attitude determination sensor and by application of the Euler equation. The attitude estimator disclosed above uses an unscented Kalman filter and uses a constant spacecraft total angular momentum vector in inertial coordinates as an additional attitude reference. The performance of the three-axis sun-sensor-only attitude estimator was verified by applying it to a sun acquisition operation. Simulations were performed and the results showed that the proposed estimator is able to generate with sufficient accuracy the about-sun-line angular rate estimate, which cannot be obtained from sun sensor measurements, and is robust against uncertainties and sun sensor noise.

The spacecraft three-axis angular rate information is needed for the control of the spacecraft orientation and attitude. Embodiments have been disclosed herein which use a relatively inexpensive sun sensor to generate the needed three-axis rate information without the need for a gyroscope or other expensive attitude sensors, such as star trackers.

The embodiments disclosed herein do not rely on accurate knowledge about the spacecraft inertia matrix and external disturbances. The innovative UKF formation allows the design to be robust against the knowledge uncertainty; i.e., good rate estimate can still be obtained when the spacecraft inertia matrix, disturbances, and initial rate are not known precisely. The mathematical expression of the UKF formulation and the simulation results (disclosed above) demonstrate the aforementioned robustness.

The system in accordance with some embodiments disclosed herein applies the principle of conservation of angular momentum in its innovative attitude estimator by using angular momentum as an additional reference to correct the attitude drift about the sun line. The requirement is that the angular momentum must have a non-zero component perpendicular to the sun line.

While exemplary embodiments have been disclosed herein, it should be appreciated that many variations are possible. It should also be appreciated that these exemplary embodiments are only examples, and are not intended to limit the scope, applicability, or configuration of the teachings herein in any way. Rather, the foregoing detailed description will provide those skilled in the art with a convenient road map for implementing various embodiments. Also it should be understood that various changes can be made in the functions and arrangements of elements disclosed herein without departing from the scope as set forth in the appended claims and the legal equivalents thereof.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the steps recited therein be performed in alphabetical order or in the order in which they are recited. Nor should they be construed to exclude any portions of two or more steps being performed concurrently or alternatingly.

The invention claimed is:

1. A method of estimating a three-axis attitude of a spacecraft, comprising:
   (a) measuring sun unit vectors at successive instants of time using a plurality of sun sensors attached to a spacecraft;
   (b) calculating angular rates and angular accelerations of the spacecraft about first and second axes perpendicular to the sun line based on the sun unit vector measurements;
   (c) calculating an angular acceleration of the spacecraft about the sun line using the sun unit vector measurements, a Euler equation and an unscented Kalman filter; and
   (d) calculating a three-axis attitude of a spacecraft based on the calculation results in steps (b) and (c).

2. The method as recited in claim 1, wherein an estimator state of the unscented Kalman filter consists of a sun line spacecraft angular rate and a sun pointing inertial frame to spacecraft body frame quaternion.

3. The method as recited in claim 1, further comprising using a spacecraft total angular momentum vector as an attitude reference.

4. The method as recited in claim 1, further comprising calculating a spacecraft total angular momentum vector in a sun pointing inertial frame each time an estimate state is updated and adjusting an estimated sun pointing inertial frame to spacecraft body frame quaternion to maintain a fixed orientation of the total angular momentum.

5. The method as recited in claim 3, wherein a reaction wheel offset angular momentum is selected such that when a major or minor axis of the spacecraft is aligned with the spacecraft angular momentum vector, solar panels coupled to the spacecraft will receive maximum current periodically at an angular rate.

6. A spacecraft comprising a body, at least one solar panel coupled to said body, a plurality of sun sensors arranged on said body, and a computer system programmed with software configured to perform the following operations:
   (a) measuring sun unit vectors at successive instants of time using a plurality of sun sensors attached to a spacecraft;
   (b) calculating angular rates and angular accelerations of the spacecraft about first and second axes perpendicular to the sun line based on the sun unit vector measurements;
   (c) calculating an angular acceleration of the spacecraft about the sun line using the sun unit vector measurements, a Euler equation and an unscented Kalman filter; and
   (d) calculating a three-axis attitude of a spacecraft based on the calculation results in operations (b) and (c).

7. The system as recited in claim 6, wherein an estimator state of said unscented Kalman filter consists of a sun line spacecraft angular rate and a sun pointing inertial frame to spacecraft body frame quaternion.

8. The system as recited in claim 6, further comprising using a spacecraft total angular momentum vector as an attitude reference.

9. The system as recited in claim 6, wherein said computer system is further programmed to calculate a spacecraft total angular momentum vector in a sun pointing inertial frame each time an estimate state is updated and adjusting an estimated sun pointing inertial frame to spacecraft body frame quaternion to maintain a fixed orientation of the total angular momentum.

10. The system as recited in claim 9, wherein a reaction wheel offset angular momentum is selected such that when a major or minor axis of the spacecraft is aligned with the spacecraft angular momentum vector, solar panels coupled to the spacecraft will receive maximum current periodically at an angular rate.

11. A method of commanding a satellite to adjust its attitude to achieve sun acquisition, the method comprising:
   (a) measuring sun unit vectors at successive instants of time using a plurality of sun sensors attached to a spacecraft;
   (b) calculating angular rates and angular accelerations of the spacecraft about first and second axes perpendicular to the sun line based on the sun unit vector measurements;
   (c) calculating an angular acceleration of the spacecraft about the sun line using the sun unit vector measurements, a Euler equation and an unscented Kalman filter;
   (d) calculating a three-axis attitude of a spacecraft based on the calculation results in steps (b) and (c); and
   (e) commanding changes in spacecraft attitude based on differences between a target three-axis attitude and said calculated three-axis rates.

12. The method as recited in claim 11, wherein an estimator state of the unscented Kalman filter consists of a sun line spacecraft angular rate and a sun pointing inertial frame to spacecraft body frame quaternion.

13. The method as recited in claim 11, further comprising using a spacecraft total angular momentum vector as an attitude reference.

14. The method as recited in claim 11, further comprising calculating a spacecraft total angular momentum vector in a sun pointing inertial frame each time an estimate state is updated and adjusting an estimated sun pointing inertial frame to spacecraft body frame quaternion to maintain a fixed orientation of the total angular momentum.

15. The method as recited in claim 11, wherein a reaction wheel offset angular momentum is selected such that when a major or minor axis of the spacecraft is aligned with the spacecraft angular momentum vector, solar panels coupled to the spacecraft will receive maximum current periodically at an angular rate.

16. A system for controlling the attitude of a spacecraft based on sun sensor measurements and not gyroscope measurements, comprising:
   a spacecraft body;
   at least one solar panel coupled to said body;
   a plurality of sun sensors arranged on said body;
   a control processor that outputs torque commands; and
   means for producing torques that change the attitude of the spacecraft in response to torque commands from said attitude control processor,
   wherein said control processor is programmed to perform operations in accordance with software comprising:

an attitude estimator for calculating a three-axis attitude and rate of said spacecraft body in a spacecraft body frame of reference based on sun unit vector measurements made by said plurality of sun sensors and a Euler equation; and an attitude controller that outputs a torque command based on a difference between a target three-axis attitude and said calculated three-axis attitude and rate, and wherein said attitude estimator comprises an unscented Kalman filter having an estimator state consisting of a sun line spacecraft angular rate and a sun pointing inertial frame to spacecraft body frame quaternion.

17. The system as recited in claim 16, wherein said torque-producing means comprise reaction wheels.

18. The system as recited in claim 17, wherein said control processor is further programmed to calculate a spacecraft total angular momentum vector in a sun pointing inertial frame each time an estimate state is updated and adjusting an estimated sun pointing inertial frame to spacecraft body frame quaternion to maintain a fixed orientation of the total angular momentum.

19. The system as recited in claim 18, wherein a reaction wheel offset angular momentum is selected such that when a major or minor axis of the spacecraft is aligned with the spacecraft angular momentum vector, solar panels coupled to the spacecraft will receive maximum current periodically at an angular rate.

* * * * *